United States Patent [19]

Shaw et al.

[11] 4,079,854

[45] Mar. 21, 1978

[54] RUPTURE DISC PRESSURE RELIEF DEVICE

[75] Inventors: Kenneth R. Shaw; Franklin A. Hansen, both of Riverside, Mo.

[73] Assignee: Continental Disc Corporation, Riverside, Mo.

[21] Appl. No.: 712,931

[22] Filed: Aug. 9, 1976

[51] Int. Cl.² ............................................. F16K 17/40
[52] U.S. Cl. ................................. 220/89 A; 137/68 R
[58] Field of Search ................... 220/89 A; 137/68 R, 137/69, 70, 71

[56]  References Cited
U.S. PATENT DOCUMENTS

| Re. 26,102 | 10/1966 | Summers et al. | 220/89 A |
|---|---|---|---|
| 2,954,897 | 10/1960 | Hansen et al. | 220/89 A |
| 3,445,032 | 5/1969 | Raidl et al. | 220/89 A |
| 3,698,598 | 10/1972 | Wood et al. | 137/68 R X |
| 3,834,581 | 9/1974 | Solter et al. | 220/89 A |
| 3,881,629 | 5/1975 | Shaw et al. | 220/89 A |

Primary Examiner—Martin P. Schwadron
Assistant Examiner—Richard Gerard
Attorney, Agent, or Firm—Fishburn, Gold & Litman

[57] ABSTRACT

A safe pressure relief assembly of the rupture disc type guards against pressure differentials beyond a predetermined range extending both above and below zero and includes a positive relief disc which is perforated to permit negative flow without rupturing, a sealing disc normally blocking the perforations, a cutting member positioned in spaced relation to the sealing disc and extending a substantial transverse distance thereacross and a sealing disc support member having a stay arrangement projecting into negative supporting engagement with the sealing disc, the stay arrangement having a resistance to collapse sufficient to retain the sealing disc out of contact with the cutting member only up to a predetermined negative pressure. The subcombination of sealing disc, stay arrangement and cutting member is separately useful, especially as a very low pressure relief device.

18 Claims, 11 Drawing Figures

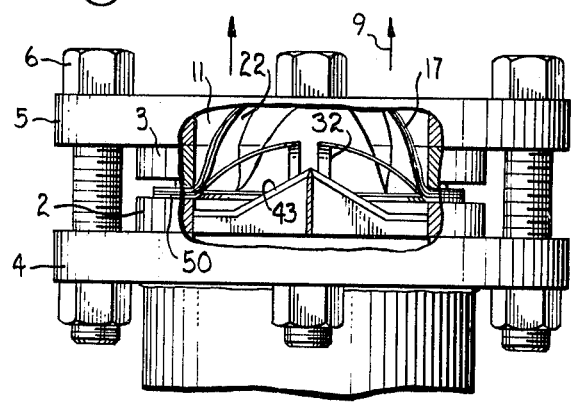
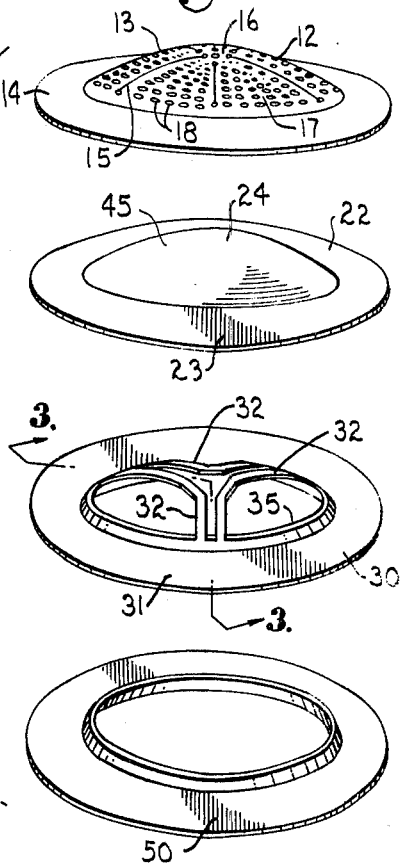
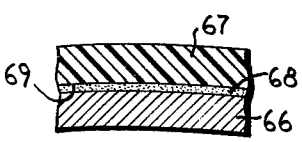
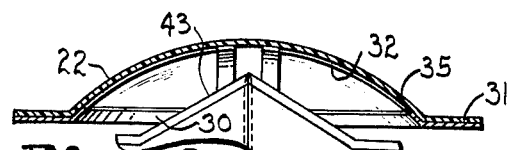
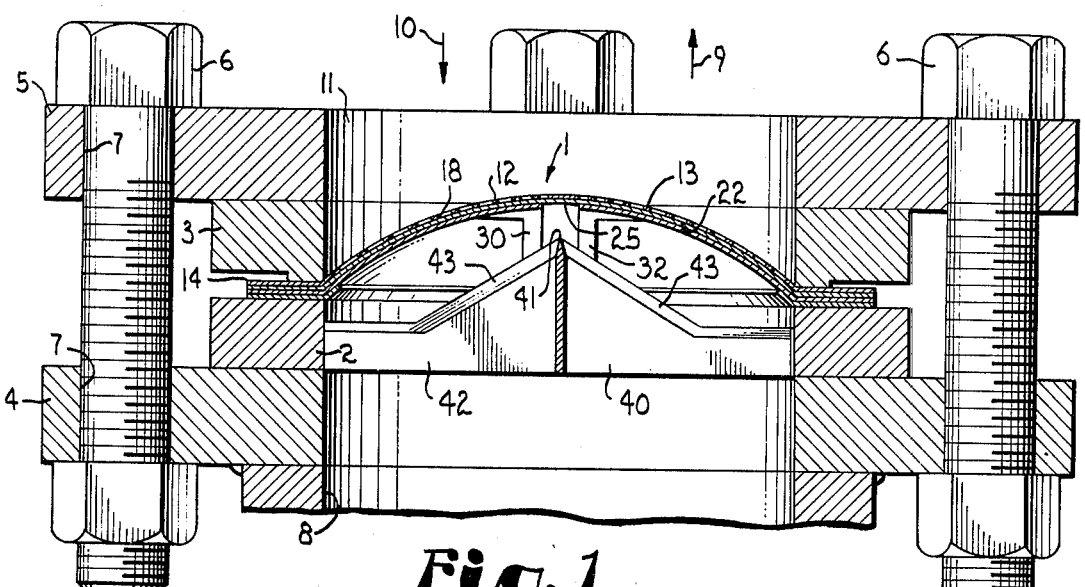

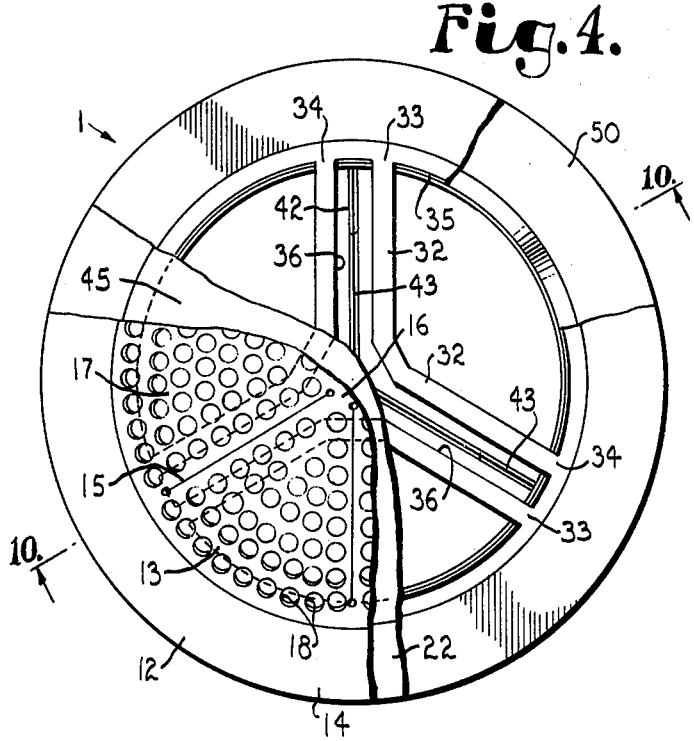
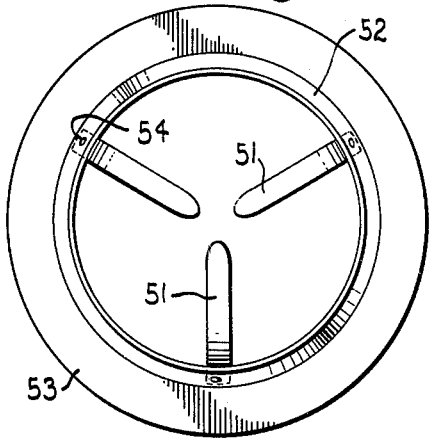
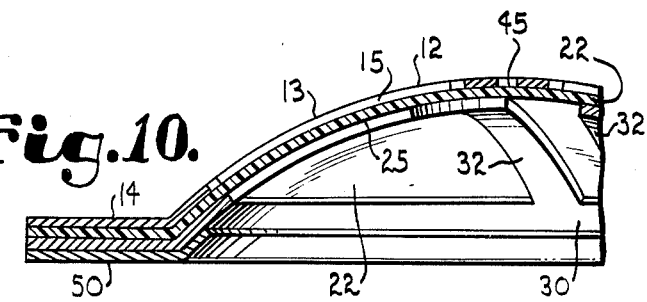
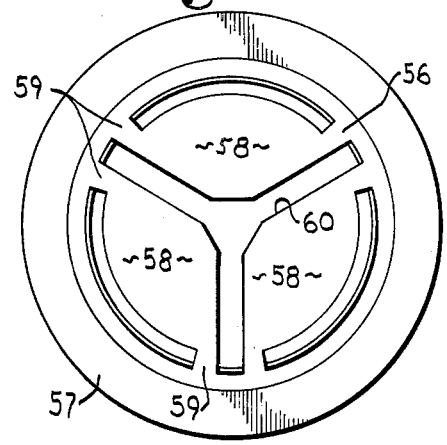
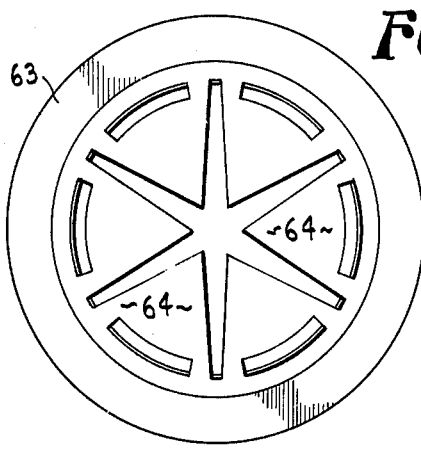
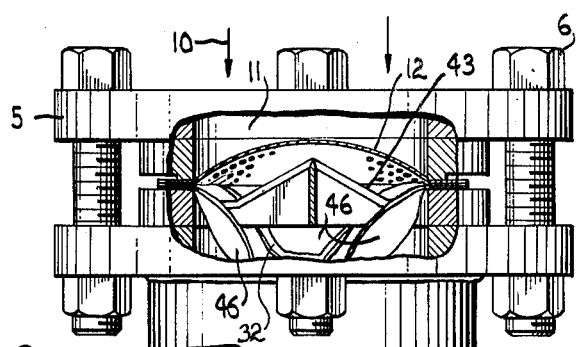

RUPTURE DISC PRESSURE RELIEF DEVICE

This invention relates to safety pressure relief devices and more particularly to improvements in rupture disc arrangements for protection against both excessive pressure and excessive vacuum.

In recent years rupture discs have found increasing use as highly reliable pressure relief devices primarily to guard against the explosive conditions created when a vessel, for any reason, is subject to excessive internal pressure. In certain applications, the same vessel for which over-pressure protection is indicated, also requires protection against excessive negative pressure or vacuum therein. By way of example, in the food processing and pharmaceutical manufacturing industries, relatively thin-walled stainless steel tanks are commonly utilized which normally contain process reactions involving controlled positive internal pressure, but subject to drops in pressure to a point substantially below atmospheric pressure. In absence of vacuum relief, such vessels may buckle inwardly under atmospheric pressure, causing considerable damage and down time. Typically, the positive pressure limit will be great compared to the negative pressure limit, for example, 5 to 50 lb./in.$^2$ versus $-0.5$ lb./in.$^2$. Yet, accurate control of both is important, the former primarily for the safety of personnel and equipment, the latter not only for equipment preservation, but for process preservation, since the opening of a vessel to ambient air can produce severe product contamination. Therefore, such manufacturing arrangements have often used various multiple devices for protecting against both overpressure and underpressure, including complex and expensive mechanical vent valves and vacuum breakers.

Positive relief rupture discs, such as the type shown in U.S. Pat. No. 3,881,629, heretofore have been modified by placing knife blades, such as that shown in U.S. Pat. No. 3,834,581, beneath the flexible seal member and placing additional openings through the rupture disc. The arrangement then operates as a normal forward-rupturing disc under positive pressure but will cause cutting of the seal upon negative pressure, allowing reverse relief flow past the disc. In many instances this proved unsatisfactory because virtually any degree of vacuum caused the flexible seal to be cut or "pinholed", thereby often requiring production shut-down even though the vacuum experienced was well within the range easily tolerated by the vessel and contents.

In the practice of this invention, the flexible seal is associated with a support member which includes a bendable or frangible and relatively open or openable stay arrangement projecting inwardly and into supporting engagement with the seal. A cutting member, having an elongated sharpened blade edge, is positioned in axially spaced relation from the seal and extending a substantial transverse distance thereacross, with the stay arrangement suitably offset from the cutting member blade edge, whereby the seal is exposed to the blade edge along a substantial radial extent for cutting a large relief passageway therethrough upon deflection of the seal thereagainst. The stay arrangement is designed to have a resistance to bending or plastic deformation just sufficient to retain the seal out of contact with the blade edge only up to a predetermined, relatively small, differential pressure applied in the appropriate direction, whereupon it will permit the seal to be cut while moving with the seal out of effective flow restricting position. This is to be contrasted with structures such as that shown in U.S. Pat. No. Re. 26,102, wherein the sealing element is more in the nature of a reverse buckling rupture disc rather than a flexible seal, is supported by a Belleville spring against collapse, operates under a relatively high pressure differential and, upon operation, provides only a small relief passageway for its size.

The principal objects of the present invention are: to provide a safety pressure relief assembly, of the rupture disc type, which is effective to block both positive and negative flow through a passageway within a predetermined, controlled range having limits extending above and below zero differential pressure; to provide such an arrangement wherein the relief pressure point in one direction can be substantially greater than the relief point in the opposite direction; to provide such a safety pressure relief device which produces a relatively large relief passageway for its size in either direction; to provide such a disc assembly which finds special value for use in connection with pressure vessels normally operating under considerable internal pressures but requiring protection against a vacuum of a relatively small value in the nature of one to ten inches of water column; to provide a pressure relief device of the rupture disc type which is predictably operable at a predetermined low differential pressure heretofore considered outside the range of such devices; and to provide such safety pressure relief arrangements which are low in cost compared to alternate devices, reliable in function even after being exposed to considerable cycling at less than operational pressures and extremely well suited for their intended purpose.

Other objects and advantages of this invention will become apparent from the following description taken in connection with the accompanying drawings wherein are set forth by way of illustration and example certain embodiments of this invention.

FIG. 1 is a somewhat schematic, vertical cross-sectional view of a safety pressure relief assembly embodying this invention.

FIG. 2 is an exploded perspective view, on a reduced scale, showing various elements, and an optional element, of the assembly.

FIG. 3 is a vertical cross-sectional view, on a reduced scale, showing one type of sealing disc support member in association with a sealing disc and cutting member.

FIG. 4 is a plan view, on the scale of FIG. 1, showing various cooperating elements in assembled relation with portions broken away to reveal details of construction and relative position.

FIG. 5 is an elevational view of the assembly, on a reduced scale, with a portion broken away revealing the relief disc and sealing disc ruptured in the positive direction and folded outwardly of the relief passageway and away from the passageway axis.

FIG. 6 is a view similar to FIG. 5 but showing the cut sealing disc and support stays folded inwardly of the relief passageway and away from the passageway axis.

FIG. 7 is a plan view, on a reduced scale, showing a modified form of sealing disc support member.

FIGS. 8 and 9 are plan views similar to FIG. 7 and showing further modified forms of sealing disc support members.

FIG. 10 is a fragmentary cross-sectional elevation, on an enlarged scale over FIG. 1, showing a rupture disc, sealing disc, sealing disc support member and optional support member support, in assembled relation.

FIG. 11 is a fragmentary cross-sectional elevation, on a further enlarged scale, illustrating an alternative construction wherein the sealing disc support member is connected to the sealing disc.

Material thickness in the drawings are often shown greatly exaggerated for illustration.

Referring to the drawings in more detail:

The reference numeral 1 generally indicates one example of safety pressure relief assembly embodying this invention. The assembly 1 is shown mounted between inlet and outlet supporting rings 2 and 3 which are, in turn, clamped between a pair of conventional annular pipe flanges 4 and 5 having a plurality of bolts 6 disposed through openings 7 positioned in spaced relationship about the peripheries thereof. It is to be understood, however, that other types of mounting arrangements may be used without departing from the scope of this invention, for example, that shown in U.S. Pat. No. 3,834,581, wherein a disc cutting member is supported within a centering ring having a flange secured between the same clamping surfaces as the disc flange. With this type of arrangement the inlet and outlet rings 2 and 3 may not be needed, their function being essentially assumed by the pipe flanges.

The assembly 1 normally blocks flow out of and into a pressure relief passageway 8 which communicates with a pressure vessel or the like for the purpose of protection against both overpressure and excessive vacuum conditions therein. Upon actuation of the assembly, as described below, positive (forward) flow 9 (FIG. 5) and negative (reverse) flow 10 (FIG. 6) are permitted through the outlet passageway 11 which then constitutes a continuation of the relief passageway 8.

The assembly 1 comprises a relief disc 12, of the forward rupturing type, for example, similar to that shown in U.S. Pat. No. 3,881,629, having a concave-convex portion 13 connected to a surrounding annular flange portion 14. In this example the flange portion 14 is flat, however, other flange configurations such as the known 30 degree seat or angular seat types may be used without departing from the scope of this invention.

The concave-convex portion 13 includes slits 15 therein radiating outwardly, from a central area 16 thereof, to locations near the annular flange portion 14, thereby defining a plurality of sector shaped leaves 17 such that, upon forward rupture as shown in FIG. 5, tearing takes place within the central area 16, allowing the relief disc to open as is further discussed below. The relief disc 12, in this example, further has a plurality of openings or perforations 18 through the sector shaped leaves 17, permitting rapid fluid flow past the concave-convex portion 13 in either direction without rupture, in absence of the sealing disc, now described.

A sealing disc 22 may be constructed of various gas impervious, flexible, easily deformable and relatively flimsy materials, including synthetic resin polymers, such as 0.001–0.005 inch thick Teflon, which have little resistance against deflection under pressure differentials in the range desired and which are not subject to substantial fatigue characteristics upon being slightly deformed in response to a large number of pressure reversing cycles. Under certain conditions, very thin metal stock may meet the necessary requirements. The sealing disc 22, in this example, has an annular flange portion 23 which, when assembled with the relief disc 12 is at least partially coextensive with the disc flange portion 14, although, if desirable, suitable gaskets or sealing materials (not shown) may be located therebetween. The sealing disc 22 here includes a central concave-convex portion 24 which, upon assembly, is nested into the relief disc concave-convex portion 13, thereby blocking the perforations 18 to normally prevent flow therethrough in the forward direction 9. The relief disc 12 and sealing disc 22, together, resist positive differential pressure in the passageway 8 up to a predetermined point when applied to the concave side 25 of the disc 22, FIG. 1.

A sealing disc support member 30 may be constructed of various materials, including selected metals and synthetic resin polymers, and, in this example, has an annular flange 31, preferably at least partially coextensive with the sealing disc flange portion 23 and three fingers or stays 32 integral therewith. The stays 32 form a saddle-like structure, projecting inwardly and axially of the flange 31 into supporting engagement with, or in close proximity to, the concave side 25 of the sealing disc 22 and comprise relatively thin, elongated, spherically and planarly curved, bridging members which respectively extend from a peripheral flange anchor point 33 to a similar anchor point 34 located a substantial angular distance away on the support member annulus or passageway 35. The individual stay arrangement is here repeated three times, once for each stay 32, so as to produce a circumferentially symmetrical pattern about the passageway 35, with the stay legs of adjacent stays being generally parallel and spaced-apart, as best shown in FIG. 4, so as to form a three-slotted, star-like aperture 36.

A cutting member 40, in this example, is suitably mounted, as by welding, on the inlet ring 2 and radiates outwardly from an axially projecting central point 41, in three legs 42, although, as noted above, other mounting structure may be used. Also, other shapes having a different number of legs are feasible. Each of the legs 42 have an elongated, sharpened (preferably surgically ground) blade edge 43 positioned in axially spaced relation from the sealing disc concave side 25 and extending a substantial transverse distance across the concave-convex portion 24. The blade edges 43 are here generally horizontal at the inner surface of the passageway 8 and, as they approach the center of the passageway, angle sharply, e.g., 30°, axially (upwardly in FIG. 1), to the central point 41, thereby producing a generally pyramidal shape roughly approximating the concave curvature on the sealing disc side 25.

The stays 32 are positioned in predetermined offset relation with respect to the cutting member 40 so that the three-slotted aperture 36 is aligned both axially and circumferentially with the cutting member blades 42, whereby the sealing disc 22 is exposed to the respective blade edges along a substantial radial extent thereof for cutting therethrough upon deflection of the sealing disc thereagainst, FIGS. 1 and 4.

The stays 32 are designed to exhibit a resistance to bending or deformation sufficient to retain the flexible sealing disc out of contact with the cutting member blade edges 43 only up to a predetermined positive differential pressure applied to the convex side 45 of the sealing disc. Such pressure will be experienced, in this example, through the relief disc perforations 18 and will essentially have no effect upon the relief disc 12.

In operation, positive differential pressure in the relief passageway 8 is resisted by the sealing disc 22, through support by the relief disc 12, up to the point where the stresses in the relief disc exceed the material strength thereof, causing the disc 12 to tear within the central area 16, whereupon both the relief disc 12 and sealing disc 22 (which has little appreciable strength when unsupported) will open as shown in FIG. 5. The leaves 17 and portions of the disc 22 will bend outwardly of the relief passageway and away from the passageway axis, providing a free and substantially open path for fluid flow 9 and pressure relief within the vessel (not shown) into which the relief passageway communicates. Unless the relief flow 9 is sufficient to cause bending or deforming forces on the stays 32, the stays are not affected thereby and due to the open configuration of the support member 30, offer little resistance to the flow. With reference to FIG. 4, note that there is considerably more relief space in the annulus or passageway 35 than stay material, allowing ample relief area without displacement of the stays 32, unless flow velocity is relatively high and the stay material relatively thin and weak.

When a vacuum condition exists in the passageway 8, the stays 32 support the sealing disc concave-convex portion 24 against deflection onto the cutting member blade edges 43 up to a predetermined pressure differential applied to the convex side 45. When this is exceeded, the stays 32 collapse, whereupon the sealing disc concave-convex portion 24 engages the blade edges 43, causing cutting therethrough along multiple substantial transverse extents thereof. The sealing disc concave side 25 will normally first contact the blade edges 43 at the point 41, producing an intial puncture which, under the force of the pressure differential, will rapidly spread, in this example, into three radially expanding and expansive slits corresponding to the extent of the cutting member blade edges 43. The three sealing disc leaves 46 thus produced will easily and rapidly bend, with the stays 32, past the blade edges 43, inwardly toward the passageway 8 and away from the passageway axis, producing a large free flow path for rapidly relieving the excessive vacuum detected in the vessel (not shown). The vacuum relief flow 10 passes through the relief disc perforations 18 and, therefore, normally does not involve the relief disc 12 and it remains essentially unaffected. However, under certain combinations of conditions when the vacuum pressure differential is relatively high and the relief disc 12 is relatively weak in buckling resistance, the disc 12 may collapse downwardly onto the blade edges 43 where it will be supported against further deflection, or under extreme conditions, cut and bent further past the edges in segments so as to more completely open the relief passageway.

A support ring 50 may be optionally utilized to provide additional and more uniform support to the stays 32 in the area of the anchor points 33 and 34, particularly under conditions where the sealing disc support member 30 is produced from very thin stock and/or the mounting ring supports or flanges are pitted or corroded.

Alternate examples of sealing disc support members are shown in FIGS. 7, 8, and 9. FIG. 7 utilizes inwardly directed, cantilever mounted, fingers or stays 51 secured to the inner periphery 52 of an annular flange 53. The stays 51 may be riveted at 54 or otherwise secured at this point by welding, adhesives, etc. or produced integrally with the flange 53 by suitable punching and deforming operations. In this structure, the cutting member blade edges will radiate from the center into the spaces between the respective stays 51, but not necessarily equadistant therebetween.

In FIG. 8, the sealing disc support member 55 covers much more of the space within the annulus 56 within the flange 57. Here, the stays are relatively large area, circular segments 58 which are supported on the flange 57 at bridging points 59, the segments being separated in a triangular pattern to form a three-legged aperture 60, which, in the assembly, will align with the cutting member legs as described above in connection with FIG. 4. This structure is intended for relatively firmer support of the sealing disc, for example, where the sealing disc material is particularly flimsy or higher pressure operating characteristics are sought. In this form, operation of the assembly in the positive direction will usually involve the bending of the segments 58 outwardly with the sealing disc and relief disc.

FIG. 9 shows a further type of support member 63 which is similar in shape and function to that described in connection with FIG. 8, but having a larger number of stays or segments 64. The member 63 is adapted to be used with a six-legged cutting member rather than the three-legged member described above.

If desired, a suitable seal (not shown) of thin, weak material may be placed within the passageway 8 to protect the cutting member 40 and sealing disc support member from corrosive or other adverse effects of moisture, chemicals, etc., which may be present within the pressure vessel during normal operation. Such seals are known in the industry and do not appreciably affect the operation of the relief assembly except in the very lowest operational ranges, where other precautions to so protect the assembly may be indicated.

Modified support characteristics may be produced by connecting the support member stays to the sealing disc. Referring to FIG. 11, a sealing disc support member stay 66 is secured to a Teflon sealing disc 67 by means of a suitable adhesive 68, the Teflon being etched on its concave side 69 prior to the application of the adhesive in order to produce the desired bond. In utilizing structures such as that shown in FIG. 11, the sealing disc will coact with the support member stays 66 to produce altered supporting and collapsing characteristics over non-connected arrangements.

It has been found that the above described structure permits a great range of both positive and negative protection, with the two limits varying considerably in magnitude, such as 50 lb./in.$^2$ positive vessel pressure limit and $\frac{1}{2}$ lb./in.$^2$ negative pressure limit, although it will be apparent to those skilled in this art that great variations in both pressure limits are feasible in utilizing this invention.

Under conditions where positive pressure limits need not be controlled by the assembly, a suitable screen or like structure (not shown) may be substituted for the relief disc 12 to support the weak sealing disc against positive pressure which would otherwise deflect same away from the support stays. Reverse or vacuum limit operation would not be affected thereby, so long as sufficient relief openings were provided in the substitute structure.

Further, the subcombination of sealing disc 22, support members 30, 53, 55, etc., and cutting member 40, as described, form the basis of an independently useful rupture disc assembly especially suitable for protection against overpressures in the relatively low ranges, e.g., one to 10 inches of water column, where heretofore rupture discs were not considered reliable.

It is to be understood that while certain forms of this invention have been illustrated and described, it is not to be limited thereto except insofar such limitations are included in the following claims.

What is claimed and desired to secure by Letters Patent is:

1. A safety pressure relief assembly of the rupture disc type for mounting between inlet and outlet supporting members and adapted to block flow therepast within a predetermined pressure range having limits extending both above and below zero differential pressure, said assembly comprising:
    (a) a relief disc having a concave-convex portion,
    (b) a plurality of perforations extending through said relief disc concave-convex portion and permitting rapid flow therepast,
    (c) a sealing disc of greater flexibility than said relief disc and having a concave-convex portion with the convex side thereof nested into the concave side of said relief disc concave-convex portion, said sealing disc blocking said perforations to prevent flow past said relief disc only up to a predetermined first pressure applied to the concave side of said sealing disc,
    (d) a sealing disc support member having stay structure projecting into close proximity the concave side of said sealing disc concave-convex portion, and
    (e) a cutting member having a cutting blade edge positioned in axially spaced relation from the concave side of said sealing disc concave-convex portion and stay structure, said blade edge operably extending a substantial part of the transverse distance across said sealing disc concave-convex portion and being offset from said stay structure whereby said sealing disc concave-convex portion is exposed to said blade edge along a substantial extent thereof for cutting therethrough upon deflection of said sealing disc concave-convex portion thereagainst,
    (f) said stay structure having a resistance to deflection only sufficient to retain said sealing disc concave-convex portion out of cutting contact with said blade edge up to a predetermined second pressure applied to the convex side of said sealing disc through said relief disc perforations.

2. The safety pressure relief assembly as set forth in claim 1 wherein:
    (a) said support member stay structure close proximity is supporting engagement.

3. The safety pressure relief assembly as set forth in claim 1 wherein:
    (a) said support member stay structure comprises a plurality of fingers projecting inwardly of said sealing disc concave-convex portion.

4. The safety pressure relief assembly as set forth in claim 1 wherein:
    (a) said support member stay structure comprises a plurality of generally circular segments.

5. The safety pressure relief assembly as set forth in claim 1 wherein:
    (a) said relief disc and said sealing disc and said support member each have an annular mounting flange at least partially coextensive with each other.

6. The safety pressure relief assembly as set forth in claim 1 wherein:
    (a) said support member includes a mounting flange integral with said stay structure.

7. The safety pressure relief assembly as set forth in claim 1 wherein:
    (a) said support member comprises a mounting flange and said stay structure includes a non-integral finger mounted on said support member flange.

8. The safety pressure relief assembly as set forth in claim 1 wherein:
    (a) said support member stay structure is connected to said sealing disc.

9. The safety pressure relief structure as set forth in claim 8 wherein:
    (a) wherein said stay structure is adhesively connected to said sealing disc.

10. In a safety pressure relief assembly of the rupture disc type:
    (a) a flexible sealing disc,
    (b) a cutting blade positioned along and spaced from one side of said disc and having a substantial length with respect to the transverse width of said disc for severing said disc along a substantial transverse extent thereof in response to a differential pressure applied to the other side of said disc,
    (c) stay structure transversely offset from the path between said cutting blade and said disc one side and extending into closer proximity to said disc one side than said cutting blade, said stay structure having a predetermined resistance to deflection so as to retain said disc out of contact with said cutting blade only up to a predetermined pressure applied to said disc other side, and
    (d) a pressure relief disc having a plurality of perforations therethrough and located in sealing disc deflection supporting arrangement with said sealing disc on said sealing disc other side.

11. The safety pressure relief assembly as set forth in claim 10 wherein:
    (a) said stay structure is in supporting engagement with said disc one side.

12. The safety pressure relief assembly as set forth in claim 10 wherein:
    (a) said stay structure comprises a plurality of fingers projecting inwardly of said sealing disc.

13. The safety pressure relief assembly as set forth in claim 10 wherein:
    (a) said stay structure comprises a plurality of generally circular segments.

14. The safety pressure relief assembly as set forth in claim 10 wherein:
    (a) said sealing disc and said stay structure each have an annular mounting flange at least partially coextensive with each other.

15. The safety pressure relief assembly as set forth in claim 10 wherein:
    (a) said stay structure includes an integral mounting flange.

16. The safety pressure relief assembly as set forth in claim 10 wherein:
    (a) said stay structure comprises a mounting flange and a non-integral finger mounted on said flange.

17. The safety pressure relief assembly as set forth in claim 10 wherein:
    (a) said stay structure is connected to said sealing disc.

18. The safety pressure relief structure as set forth in claim 17 wherein:
    (a) wherein said stay structure is adhesively connected to said sealing disc.

* * * * *